US008698067B2

(12) United States Patent
Geloven et al.

(10) Patent No.: US 8,698,067 B2
(45) Date of Patent: Apr. 15, 2014

(54) SYSTEM AND METHOD FOR DETECTING MOVEMENT OF AN OBJECT AND INTEGRATED CIRCUIT IMPLEMENTATION THEREOF

(75) Inventors: Johannes Anthonie Josephus Van Geloven, Eindhoven (NL); Bernardus Martinus Johannes Kup, Eindhoven (NL)

(73) Assignee: NXP B.V., Eindhoven (NL)

( * ) Notice: Subject to any disclaimer, the term of this patent is extended or adjusted under 35 U.S.C. 154(b) by 513 days.

(21) Appl. No.: 13/120,827

(22) PCT Filed: Sep. 26, 2009

(86) PCT No.: PCT/IB2009/054221
§ 371 (c)(1),
(2), (4) Date: Mar. 25, 2011

(87) PCT Pub. No.: WO2010/035240
PCT Pub. Date: Apr. 1, 2010

(65) Prior Publication Data
US 2011/0174959 A1    Jul. 21, 2011

(30) Foreign Application Priority Data
Sep. 26, 2008   (EP) ..................................... 08165297

(51) Int. Cl.
*G06M 7/00*       (2006.01)
(52) U.S. Cl.
USPC ....................................... 250/221; 250/222.1
(58) Field of Classification Search
USPC .......... 250/201.1, 203.1, 203.2, 203.4, 203.7, 250/222, 222.1; 340/555–557
See application file for complete search history.

(56) References Cited

U.S. PATENT DOCUMENTS

| 4,731,530 A | 3/1988 | Mikan |
| 4,935,728 A | 6/1990 | Kley |

(Continued)

FOREIGN PATENT DOCUMENTS

| EP | 1 288 773 A2 | 3/2003 |
| EP | 1 858 160 A1 | 11/2007 |

(Continued)

OTHER PUBLICATIONS

International Search Report and Written Opinion for Int'l. Patent Appln. No. PCT/IB2009/054221 (Oct. 18, 2010).

*Primary Examiner* — Francis M Legasse, Jr.

(57) ABSTRACT

The present invention relates to a detection system for detecting movement of a movable object. The detection system comprises a light source (S) for emitting light, a reflecting unit (8) being arranged in functional connection with the movable object (6) and being adapted for reflecting the emitted light, at least one detector (D1 to D4) for detecting the reflected light and outputting detection signals for determining the movement of the movable object, an analogue-to-digital converter which includes at least one current source for obtaining a digital signal, and a common mode controller for outputting at least one common mode signal for controlling the at least one current source, wherein the digital signal which is indicative of the movement of the movable object in a predetermined direction being based on the output signal of the at least one detector and the at least one common mode signal. The present invention also concerns a method of detecting movements of a movable object, as well as an integrated circuit having implemented therein the detection system.

14 Claims, 9 Drawing Sheets

(56) References Cited

U.S. PATENT DOCUMENTS 5,943,233 A 8/1999 Ebina et al.
2005/0162389 A1 7/2005 Obermeyer et al.
2007/0040108 A1* 2/2007 Wenstrand .................. 250/221

FOREIGN PATENT DOCUMENTS

| JP | 08-255053 A | 10/1996 |
| WO | 2007/122556 A2 | 11/2007 |
| WO | 2010/035239 A1 | 4/2010 |

* cited by examiner

SYSTEM AND METHOD FOR DETECTING MOVEMENT OF AN OBJECT AND INTEGRATED CIRCUIT IMPLEMENTATION THEREOF

FIELD OF THE INVENTION

The present invention refers to a detection system, and in particular to a detection system for detecting the movements of a movable object and obtaining corresponding detection signals, to a method of detecting movements of the movable object, and to an integrated circuit having implemented therein the detection system for detecting the movements of the movable object.

BACKGROUND OF THE INVENTION

In the recently growing market for mobile devices, such as mobile phones, PDAs, the diversity in functionalities and user interfaces have increased so that in most existing mobile devices a display (for example a Liquid Crystal Display LCD) is provided having a cursor which is to be controlled by the user usually by means of a 5-way joystick. Such a joystick may contain five switches located under the dome of a knob which is to be operated by the user for obtaining the movement of the cursor on the display. One of four switches is closed depending upon moving the joystick which constitutes a movable object, to the left or right side. A "click" function can be obtained in conjunction with the fifth switch based on an operation of the user pressing the joystick vertically depending upon a certain item on a menu where the cursor is actually positioned.

Mobile devices as mentioned above may have an increasingly larger display, and the control menu of such devices becomes more and more complex. A continuous and highly sensitive and reliable control of the cursor by means of the joystick is required. Moreover, such a joystick for mobile devices must be compact, robust, must have a low power consumption and also a low price.

In this connection, reference WO 2007/122556 A2 discloses a detection circuit for detecting movements of a movable object such as a joystick, wherein a plurality of first detection units is provided for detecting the presence or absence of a light spot on the detection units, the light spot being influenced in its position by the movement of the movable object. Second detection units are provided for detecting light intensities of the light spot depending upon a movement of the movable object in a further direction. Specifically, two intensities of the light spots are detected by the second detection units, and an output signal is obtained indicative of a movement of the movable object in a Z-direction representing the click function of the joystick arrangement. The output signals of the detection units are compared with corresponding reference signals, resulting in a one bit digital signal. The signals are digitalized at every photodetector of the detection units to obtain the digitalized signal ready for further data evaluation. The detection units comprise photodiodes and transistors for digitizing the signals from the photodiodes.

SUMMARY OF THE INVENTION

It is an object of the present invention, to provide a detection system for detecting movements of a movable object, method of detecting movements of the movable object, and an integrated circuit having implemented therein the detection system for detecting the movement of a movable object, wherein a reliable detection of the movements of the movable object is ensured based on a simplified circuit arrangement.

According to an aspect of the present invention, this object is accomplished by a detection system for detecting movements of a movable object, method of detecting movements of the movable object, and an integrated circuit having implemented therein a detection system for detecting the movements of the movable object according to the appended claims.

According to a first aspect of the present invention the detection system for detecting movement of a movable object comprises a light source for emitting light, a reflecting unit being arranged in functional connection with the movable object and being adapted for reflecting the emitted light, at least one detector for detecting the reflected light and outputting detection signals for determining the movement of the movable object, an analogue-to-digital converter which includes at least one current source for obtaining a digital signal, and a common mode controller for outputting at least one common mode signal for controlling the at least one current source, wherein the digital signal which is indicative of the movement of the movable object in a predetermined direction being based on the output signal of the at least one detector and the at least one common mode signal.

Hence, according to the present invention, a precise detection of a click or release of the joystick representing the movable object can reliably be detected. The operation of the joystick for obtaining the click or release function corresponds to a movement in a Z direction. The detection of the click and release function is completely coupled to the analogue-to-digital converter ADC to obtain, from the measurement or detection signals, a precise digital detection signal.

It is to be noted that the exact current through the diodes of the sensing elements does not need to be known. An increase in the current in the circuitry due to an increased light intensity on the detectors or a corresponding decrease of the respective parameters (when the click function is performed by the user of the detection system) is reliably detected and is converted into a digital value representing the desired release or click function. The circuit arrangement according to the present invention therefore provides an easy way of detecting the click and release function of the movable object with simplified circuitry, and the circuitry can be integrated together with the further components of the detection system preferably on one chip.

Preferred embodiments of the present invention are defined in the appended claims.

The detection system of the present invention may further comprise a plurality of detectors being arranged symmetrically relative to the light source and the reflecting unit may be arranged with a predetermined distance above the light source for directing reflected light to the plural detectors.

The at least one detector, the light source, the common mode controller and the analogue-to-digital converter may be arranged on a substrate, and the reflecting unit may be adapted for causing a light spot to be incident on the substrate.

Moreover, the movable object may be a knob being elastically supported for at least the predetermined movement causing a variation of irradiance of the reflected light on the at least one detector.

The at least one detector may be a photosensitive element, the light source may be a light emitting element, and the reflecting unit may be a metalized reflection surface.

The analogue-to-digital converter may comprise a capacitance connected to the at least one detector and the at least one current source, and a comparator to which the potential of the capacitor is supplied for generating the digital signal.

The light spot caused by the reflecting unit may include a predetermined irradiance profile of reflected light, and the determination of the movement of the movable object in the predetermined direction may be based on an increase in the irradiance profile of the light spot on the at least one detector due to the movement, and the light spot of the reflected light on the at least one detector may have a predetermined size which remains unchanged when the movable object is moved.

The at least one common mode signal may be adapted for determining the amount of current flowing through the at least one current source, and the at least one current source may be connected via at least one switch to a capacitance the potential of which being supplied to a comparator of said analogue-to-digital converter for generating said digital signal.

The detection system of the present invention may further comprise a plurality of switches, and the comparator may be adapted to compare the potential of the capacitance with a predetermined reference value, and may control an opened or closed state of the switches depending upon the comparison result.

The detection system may further comprise a counter being adapted for counting clock pulses based on a clock signal, and the counted number of clock pulses being dependent on the opened or closed state of the plural switches controlled by the comparator.

The comparator may control the opened or closed state of the plural switches according to a predetermined timing, and the predetermined timing being based on the current flowing through the at least one detector.

The detection system may further comprise an evaluation unit being adapted for comparing the pulses counted by the counter with previous counted results for determining the movement of the movable object in the predetermined direction.

The present invention according to a further aspect concerns an integrated circuit having implemented therein a detection system for detecting the movement of a movable object according to the first aspect of the invention.

The present invention according to a still further aspect concerns a method of detecting movements of a movable object, the method comprising the steps of: radiating light to a reflecting unit and reflecting the light to at least one detector, detecting the reflected light and outputting detection signals for determining the movement of the movable object, generating at least one common mode signal depending upon the detection signals, and generating a digital signal indicative of the movement of the movable object in a predetermined direction based on the detection signal of the at least one detector and the at least one common mode signal.

Hence, according to the method of the present invention, a precise detection of a click or release of the joystick representing the movable object corresponding to a movement in a Z direction can reliably be detected.

The present invention is further elucidated by the following Figures and examples, which are not intended to limit the scope of the present invention. The person skilled in the art will understand that various embodiments may be combined, lying within the scope of the present invention.

BRIEF DESCRIPTION OF THE DRAWINGS

The above object, advantages and features together with numerous other advantages and features will be apparent from the embodiments of the present invention described hereinafter.

In the following drawings.

DETAILED DESCRIPTION OF THE DRAWINGS

Figure 1:
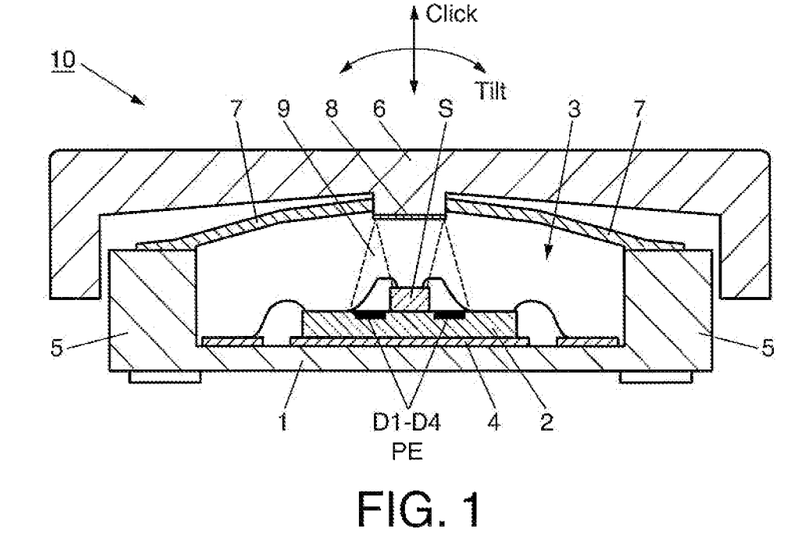
FIG. 1 shows a cross-sectional view of the arrangement of the detection system of the present invention.

FIG. 1 shows an overall configuration in the form of a cross-sectional view of the detection system 10 according to the present invention.

According to the examples described in this specification the detection system 10 according to the present invention is implemented as a joystick preferably of any movable device. In the following it is therefore also referred to a joystick, which may be provided in the form of an optical joystick or may be part of any other appointing device for controlling a cursor on a display of portable devices.

According to FIG. 1, the cross-sectional view shows a package (or casing) 1, wherein on a substrate 2 arranged in a cavity 3 of the package 1 a plurality of detectors (photosensitive elements, light receiving elements) D1 to D4 is provided. The plurality of detectors D1 to D4 which have a sensing function of light and of which due to the cross-sectional view only detectors D3 and D4 are shown, is arranged on or embedded in the substrate 2. The substrate 2 is fixed to the package 1, preferably in the central portion thereof in the cavity 3 by means of a metal layer 4.

A light source S which constitutes of a light emitting element or plural light emitting elements (light emitting means) is provided adjacent to the plurality of detectors D1 to D4 and preferably but not necessarily at the central portion of the substrate 2. That is, preferably the light source S is located at a central portion of the substrate 2 having the plurality of detectors D1 to D4 arranged around the light source S, preferably according to a predetermined pattern and/or symmetry.

Necessary electrical connections between the package 1 and the plurality of detectors D1 to D4 and the light source S are provided by bonding wires depicted in FIG. 1, and the electrical connections of the package 1 to the outside can be ball-grid; SMD (surface mounted devices), etc., but also flexible connections are possible. The cavity 3 of the package extends above the light source S and the detectors D1 to D4, that is, above the substrate 2, and is surrounded by sidewalls 5 on both sides of the package 1.

Accordingly, the substrate 2 in conjunction with the plurality of detectors D1 to D4, the light source S and the corresponding bonded connections may be commonly housed inside the package 1, which may be provided in the form of an IC package. This IC package therefore includes the detection system 10 according to the present invention.

Alternatively, the substrate 2 according to the present invention and including the above-mentioned components may be molded inside a transparent material which may also serve as an IC package while still light can go through the transparent material.

In the vertical direction in FIG. 1 above the light source S there is a touch surface provided according to a preferred embodiment in the form of a knob 6. The knob 6 which constitutes the touchable part of the detection system 10 represents a general movable object.

The movable object preferably provided in the form of the knob 6 basically constitutes a cover over the package 1 and the cavity 3 thereof, as shown in FIG. 1, and may be movable to a certain extent relative to the package 1. To this end, the knob 6 is movably supported by a flexible suspension mechanism which is preferably provided by means of at least one spring 7 which allows the knob 6 to be tilted a few degrees around a virtual point when a user's finger intends to operate the detection system 10 and applies a force to the knob 6 (movable object). Due to the elastic support of the knob 6 on the package 1 by the spring 7 the knob 6 can be moved to different positions within a certain range of movement and will resume a rest position (the position of the knob 6 as shown in FIG. 1) when the force of the user's finger is removed.

At a lower surface or portion of the knob 6, basically on the surface thereof of facing the cavity 3 of the package 1 a reflecting unit 8 is provided which can have a symmetrical shape such as a square shape or a circular shape, and which is provided for reflecting light (emitted from the light source in an upward direction towards the reflecting unit 8) back in the direction to the plurality of detectors D1 to D4 (downward direction in FIG. 1).

The reflecting unit 8 which is adapted to reflect at least part of the emitted light, may be provided in the form of a mirror which may have the above-mentioned shape and which is mounted basically at the central portion of the knob 6 which may be provided in the form of a protruding portion extending in a direction downward in FIG. 1 towards the substrate 2 and in particular towards the light source S. The reflecting unit 8 can also be provided as a metalized and therefore reflecting surface, by applying a metalized layer or film to this predetermined portion of the knob 6.

The spring 7 may be arranged so that the knob 6 is fixed at a predetermined position which corresponds to the rest position (shown in FIG. 1) from which any movement to the left or right side (tilting movement) can be made. The movement range may be limited by the sidewalls 5 of the package to which also according to the preferred embodiment the spring 7 is fixed.

Figure 2:
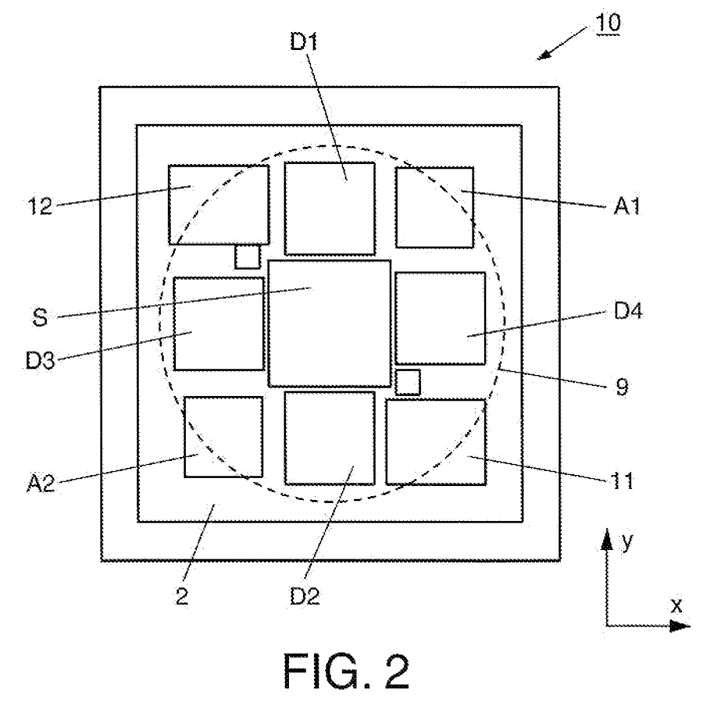
FIG. 2 shows a floor plane of the detection system according to the present invention.

It is specifically to be noted that the shape and the construction of the spring, the shape and the dimensions of the package 1 and the arrangement of the knob 6 (movable object) as shown in FIG. 2 just form an explanatory example, and these components may be provided or designed in a different suitable manner provided that the proper interaction with the further components of the detection system (joystick) 10 is ensured. In this connection, the knob 6 may be made of an elastic material having a certain compliance when pressed by the user's finger, or may be made of a rigid material.

The knob 6 which is flexibly and movably supported by the at least one spring 7 stands in an upright position as is shown in FIG. 1 (the rest position when no force is applied to the knob 6). In this case the reflecting unit 8 is basically parallel to the upper surface of the substrate 2, and due to the specific position of the reflecting unit 8 facing the light source S, light emitted from the light source S is reflected by the reflecting unit 8, and a light spot 9 is caused on the substrate 2 and in particular on the plurality of detectors D1 to D4.

As is shown in FIG. 1, all of the plurality of detectors D1 to D4 are arranged on the substrate 2 in the package 1 in such a manner, that they lie completely within the light spot 9 caused by the reflecting unit 8. In other words, when the knob 6 has resumed the rest position (no force applied by the user's finger) as shown in FIG. 1 each of the plurality of detectors D1 to D4 basically receives an equal amount of light, and the output signals of the respective detectors D1 to D4 are almost the same (tilt angle of the knob: $\alpha=0$).

Further details about the arrangement of the above-described components of the detection system 10 and of further components thereof are explained hereinafter in conjunction with the representation shown in FIG. 2. Specifically, FIG. 2 shows a floor plan of the detection system 10 according to the present invention which represents a top view on the substrate 2 of the package 1 of FIG. 1.

Basically in a central portion of the substrate 2 the light source S is arranged. The light source S may be composed of a light emitting diode emitting a light of a specific intensity and wave length (color). The light source S may also be composed of a plurality of light emitting diodes LED being arranged according to a predetermined pattern (array) wherein each of the particular light emitting diodes emits part of the complete light emission intensity (irradiance) necessary for the function of the present detection system.

The light emitting diode or plurality of diodes of the light source S emits the light in an upward direction which is perpendicular to the paper plane of FIG. 2, that is, towards the reflecting unit 8 placed basically symmetrically above the light source S.

According to a certain symmetry, the plurality of detectors D1 to D4 is arranged around the light source S. The detectors D1 to D4 may be provided in the form of a plurality of light sensitive elements, such as photodetectors, the particular photodetectors of each of the detectors D1 to D4 being arranged according to a predetermined pattern or array within the area of each of the detectors D1 to D4. By means of the reflecting unit 8, the light emitted by the light source S is reflected towards the substrate 2 of the package 1, thereby causing the light spot 9 on the substrate 2 and including an area covering the position of each of the plurality of detectors D1 to D4.

In FIG. 2 the light spot 9 of reflected light from the reflecting unit 8 is shown by means of a dashed circle. The circular shape of the light spot as shown in FIG. 2 is, however, merely an example, and the present invention is not limited to such a shape and area of the light spot 9. The light spot 9 in view of the covered area and the shape may depend on the arrangement and shape of the light source S and the shape of the reflecting unit 8.

As can be seen from the context of FIG. 2, in this preferred embodiment, all the plural detectors D1 to D4 lie within the predetermined area covered by the light spot 9. This is, however, merely an example, since depending upon the shape and area of the light spot 9 particular detectors of the plural detectors D1 to D4 may only be partly covered by the light spot 9.

On the substrate 2 shown in FIG. 2 further areas are allocated to further digital circuit areas, such as the areas 11 and 12, which may be used to implement further general digital circuitry.

Moreover, the substrate 2 according to FIG. 2 includes predetermined areas such as areas A1 and A2 allocated to analogue-to-digital converters ADC the arrangement and structure of which will be described hereinafter in conjunction with the further function of the detection system 10 according to the present invention.

Regarding the representation shown in FIG. 2, it is to be noted that this arrangement is not limited to the square outline of the light source, but different shapes of the light source can be provided within the usual design options. Moreover, the reflecting unit 8 may also be of different shape and design to obtain, in this case, different shapes of the light spot 9 on the area of the substrate 2 accommodating or supporting the detectors D1 to D4 and the light source S. In FIG. 2, for example, the light spot 9 is shown as a circular area.

It is further to be noted that according to FIG. 2 the detectors D1 to D4 are arranged as basically square areas. The invention is, however, not limited thereto, as a shape of the areas covering the detectors may be modified to other suitable shapes. Each of the areas of the detectors D1 to D4 may cover a plurality of particular light sensitive elements, such as photodiodes or phototransistors or any other photosensitive components. The photosensitive components can be evenly distributed in the dedicated area or can be arranged according to a predetermined pattern which may further depend on the technology used and further design conditions. Variations in this respect do not influence the performance of the present invention.

When the knob 6 representing the movable object has not been touched by the user for operation so that the tilt angle $\alpha=0$, the knob 6 is arranged in such a manner that it stands upright in the rest position as shown in FIG. 1. This position of the knob 6 and, thus, of the reflecting unit 8 causes, for example, the light spot 9 as shown in FIG. 2.

In case the knob 6 is operated by the user, i.e. is touched by the user and tilted to a tilt angle $\alpha \neq 0$, this causes, by basically maintaining the size and position of the light spot 9 on the substrate 2, a variation in the light intensity on particular detectors D1 to D4.

Specifically, a movement in the X-direction causes a modification of the light intensity distribution on the particular detectors D3 and D4, whereas a movement of the knob 6 (and of the reflecting unit 8) in the Y direction causes an intensity variation on the particular detectors D1 and D2.

Accordingly, since the symmetry of incident light on the plurality of detectors D1 to D4 is broken due to the tilted knob 6 which may be tilted in any possible direction (causing the reflecting unit 8 to be tilted in the same manner), in case of any movement of the knob 6 in the X-direction and to the right hand side in FIG. 2, the fourth detector D4 receives more light than the third detector D3 while the first and second detectors D1 and D2 still basically receive an equal amount of light. Other movements change the light intensity (the amount of light incident on particular detectors D1 to D4) in a similar and respective manner.

After data evaluation of the output signals of the detectors D1 to D4, for example, in comparison with suitable threshold values, a precise information about the movement of the knob 6 operated by the user can be obtained. This is used for controlling the position of a cursor on any corresponding display.

Regarding the arrangement shown in FIGS. 1 and 2, the size of the light source S, the size of the reflecting unit 8, the distance between the light source S and the reflecting unit 8 and the dimensions of the plurality of detectors D1 to D4 is preferably chosen so that the detectors D1 to D4 lie totally inside the light spot 9 in both the rest position or when the knob 6 in conjunction with the reflecting unit 8 is tilted to any design maximum angle. The range of the tilt angle $\alpha$ of the knob 6 and of the reflecting unit 8 is limited by the knob 6 by the sidewalls 5 of the package 1. In FIG. 1, in the upper portion thereof arrows are shown to indicate the possibility of operating the knob 6 by the user. That is, the arc-shaped arrow with the inscription "tilt" indicates the range of the tilt angle which can be applied to the knob 6.

The vertical arrow in FIG. 1 with the inscription "click" indicates the detection in the Z-axis perpendicular to the X and Y plane, and this will be described in greater detail hereinafter.

Figure 3:
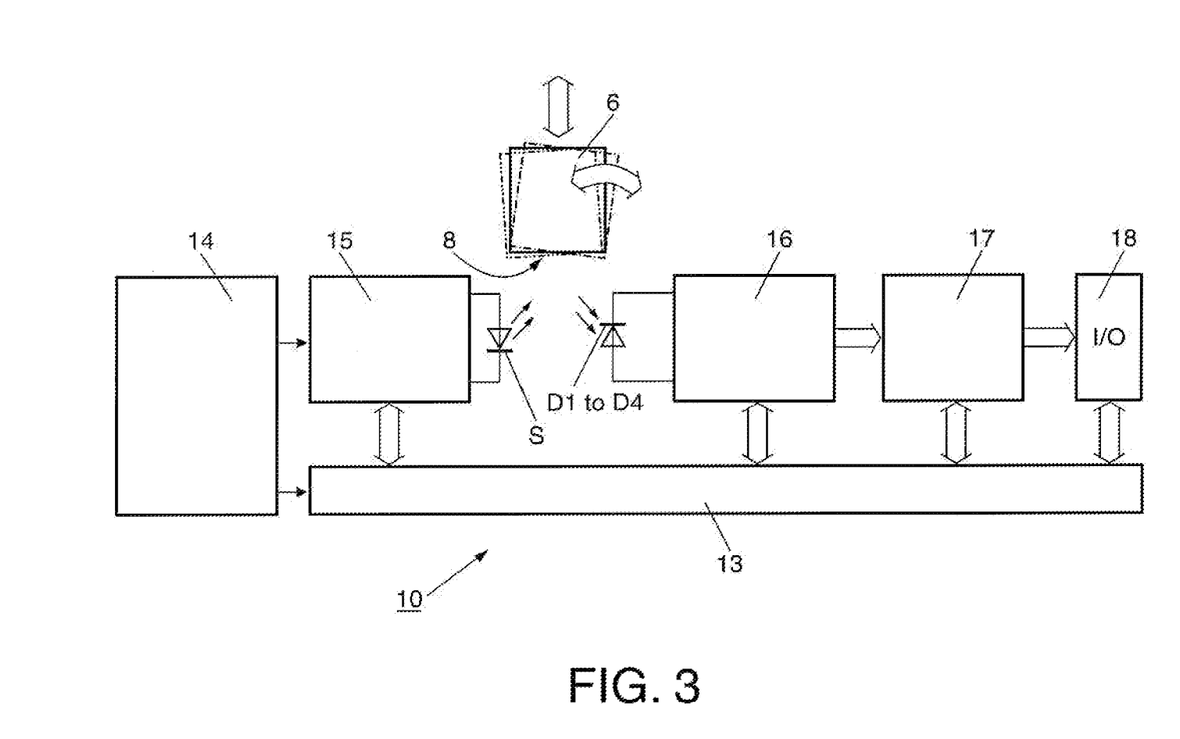
FIG. 3 shows a block circuit of the detection system representing the data processing components according to the present invention.

FIG. 3 shows a block circuit arrangement in conjunction with mechanical components according to the detection system of the present invention.

According to FIG. 3, the light source S is represented by a light emitting diode LED and emits light directed to the lower portion (lower surface) of the knob 6 which covers the reflecting unit 8. Light from the light source S is reflected by the reflecting unit 8 and is irradiated on the detectors D1 to D4, being represented in FIG. 3 by a photosensitive element such as, for example, a photodiode.

The circuit arrangement includes a central controller (central data evaluation and control means) 13 for performing the overall control of the detection system. The controller 13 receives information from other components and provides, after a corresponding and predetermined data evaluation (according to predetermined programs) a control of the entire detection system.

In particular, the controller 13 is connected to a system clock unit 14 adapted for providing the detection system with the necessary system clocks. The controller 13 (and also the clock unit 14) is connected to light source controller 15 which is adapted for controlling the light emitting diodes LED of the light source S, thereby providing a power control of the light source S, that is, a control of the emitted light intensity (amount of light).

The control of the light source S provided by the light source controller 15 may also include a control of the wavelength or frequency (color) of the emitted light. The possibilities of control depend on the particular light emitting elements used in the light source and may further depend on the sensitivity of the photosensitive elements of the detectors D1 to D4.

The detectors D1 to D4 are connected to a click detector 16 wherein a first preprocessing of the output signals of the detectors D1 to D4 is performed.

The detection result of the click detector 16 is fed to a data processor 17 which is adapted for providing the further data processing, that is, to provide a data evaluation of the output signals of the click detector 16 to obtain an information about a desired cursor movement. Accordingly, the click detection in the click detector 16 and the data processing in the data processor 17 provide a correlation between the movement of the knob 6 caused by an operation of the user, and the desired movement of the cursor on a respective display.

The information obtained in the data processor 16 can be fed, by means of a further interface unit 18 (I/O) to the outside of the detection system, which corresponds to any further device or apparatus including the display which is to be controlled.

In conjunction with FIG. 3, as a schematic example, one light sensitive element, such as a photodiode, is represented as the detectors D1 to D4. It is in this connection to be noted that the click detection, that is, the detection in the Z-direction, can be performed based on the output signals of all the light sensitive elements of each of the plurality of detectors D1 to D4.

However, according to a preferred embodiment of the present invention, particular (selected) photosensitive elements of the plurality of detectors D1 to D4 can be allocated to the click detector 16 specifically for obtaining the click detection (Z detection). It is also further possible, to provide in addition to the photosensitive elements of the plurality of detectors D1 to D4 at least one or preferably a predetermined number of additional photosensitive elements (not shown) which mainly serve for click detection, these additional photosensitive elements being connected to the click detector 16.

The additional photosensitive elements may be arranged on the substrate 2 preferably on the one hand adjacent to the plurality of detectors D1 to D4, and on the other hand close to the position of the light source S. The present invention is, however, not limited to such an arrangement, and the additional photosensitive elements dedicated for click detection can be arranged at any position on the substrate 2 provided that these photosensitive elements fully lie within the light spot 9 caused by the reflected light from the light source S by means of the reflecting unit 8, irrespective of whether the knob 6 is moved to any maximum value of the tilt angle α by an operation of the user.

Regarding the detection concept mentioned above, FIG. 4 shows a detection wave form (light intensity curve, irradiance) on particular photosensitive elements PE either being separately provided or forming part of the detectors D1 to D4. The output signals of at least one photosensitive element D1 to D4 or PE is to be used.

Figure 4:
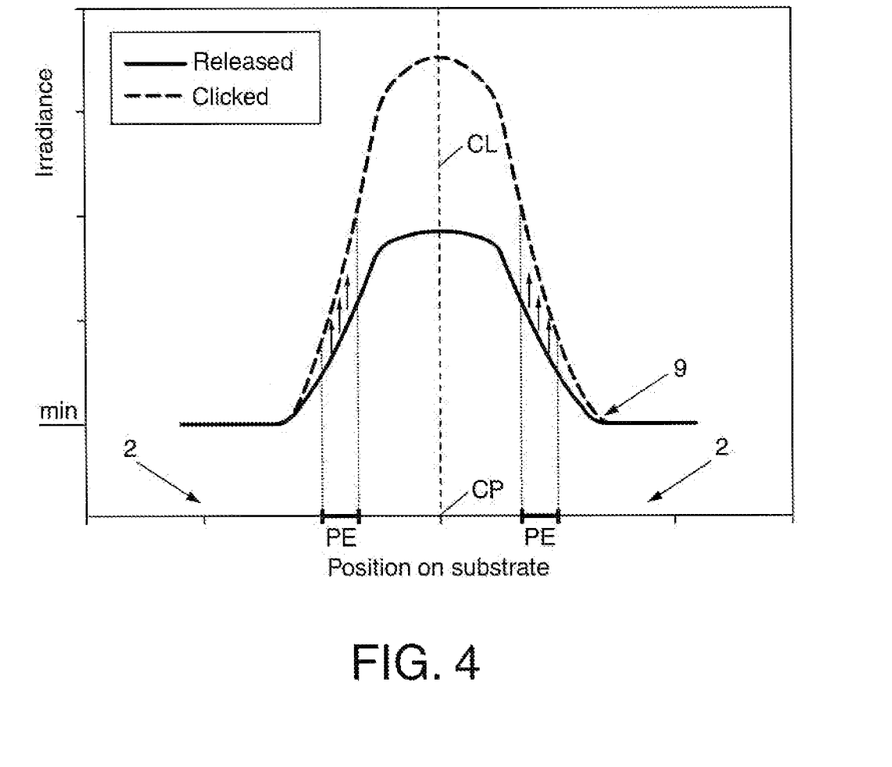
FIG. 4 shows calculated irradiance profiles of the released and the clicked position upon which the click detection is based.

When the movable object in the form of the knob 6 is released and maintained by the at least one spring 7 at the rest position (central position of the knob 6), the irradiance on photosensitive elements PE, one positioned on the left side of the light source S and the other being positioned on the right side thereof, sense a predetermined irradiance (amount of illumination, light intensity) of reflected light. Corresponding output signals of the photosensitive elements PE are communicated to the click detector 16 for further evaluation.

When the knob 6 is operated by the user specifically by depressing the knob 6 downward in FIG. 1 (click function) so that the distance between the light source S and the reflecting unit 8 is decreased, the irradiance on the substrate 2 increases, as is shown by a dashed curve in FIG. 4. Regarding the part of irradiance incident on the particular photosensitive elements PE, the irradiance increases as is mentioned by arrows in the upward direction.

Hence, an irradiance difference is obtained, and specifically the irradiance incident on the photosensitive elements PE is increased when the knob 6 is depressed by the user to obtain the click function.

The increased intensity and, thus, the user's desired click function, and specifically a higher current flowing through the photosensitive elements PE is detected by the detection system according to the present invention, and specifically by means of the click detector 16, the operation of which will be described in the following.

In FIG. 4 the curve of irradiance on the substrate is in a preferred manner but not necessarily basically symmetric about a centerline CL which is perpendicular to the X and Y plane, and which contacts the X and Y plane, represented by the substrate 2, substantially at the center of the light source S. The positions relative to the substrate 2 where the irradiance on the substrate is minimum correspond to the borderline of the light spot 9.

Figure 5:
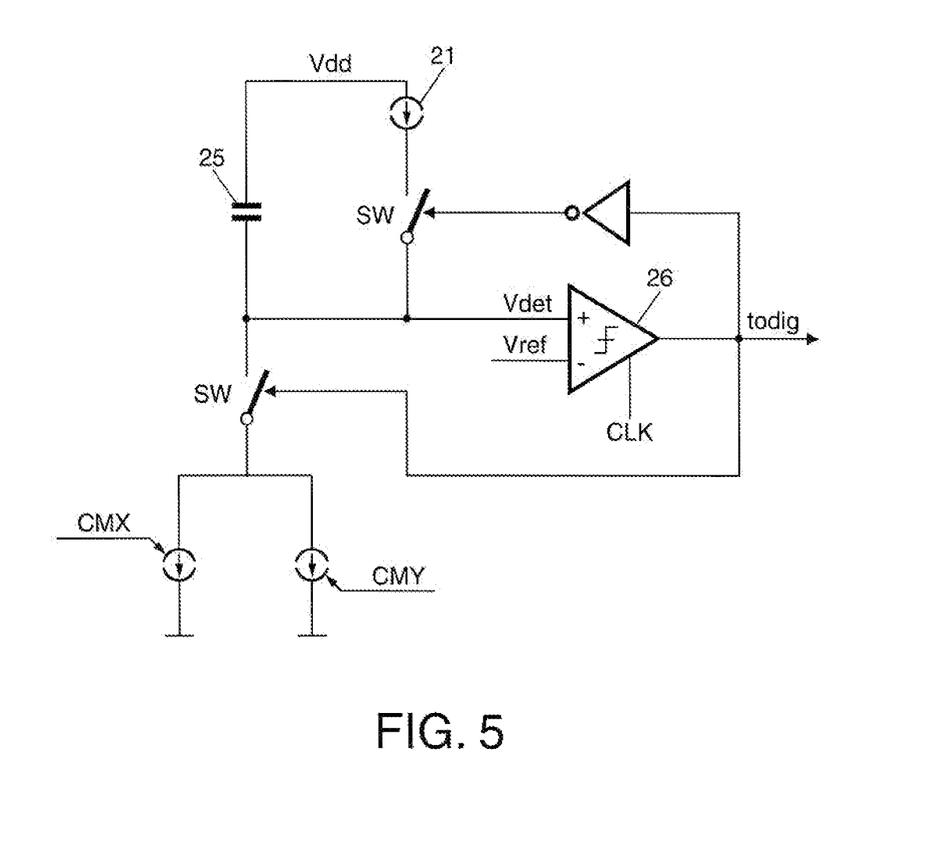
FIG. 5 shows a principle circuit arrangement of the analogue-to-digital converter ADC.

FIG. 5 shows a principle circuit arrangement of the analogue-to-digital converter for measuring the click function (click operation of the detection system) based on the measurement of current differences.

The circuit arrangement shown in FIG. 5 further includes at least one current source and preferably two bottom current sources, which are the first current source 21 and the second current source. A further current source represented by the third current source as a top current source is provided and may be chosen fixed to about 10 times the maximum current through the bottom current sources. This chosen current of the top current source (third current source) is a preferred value, and the present invention is not limited to this value.

Figure 6:
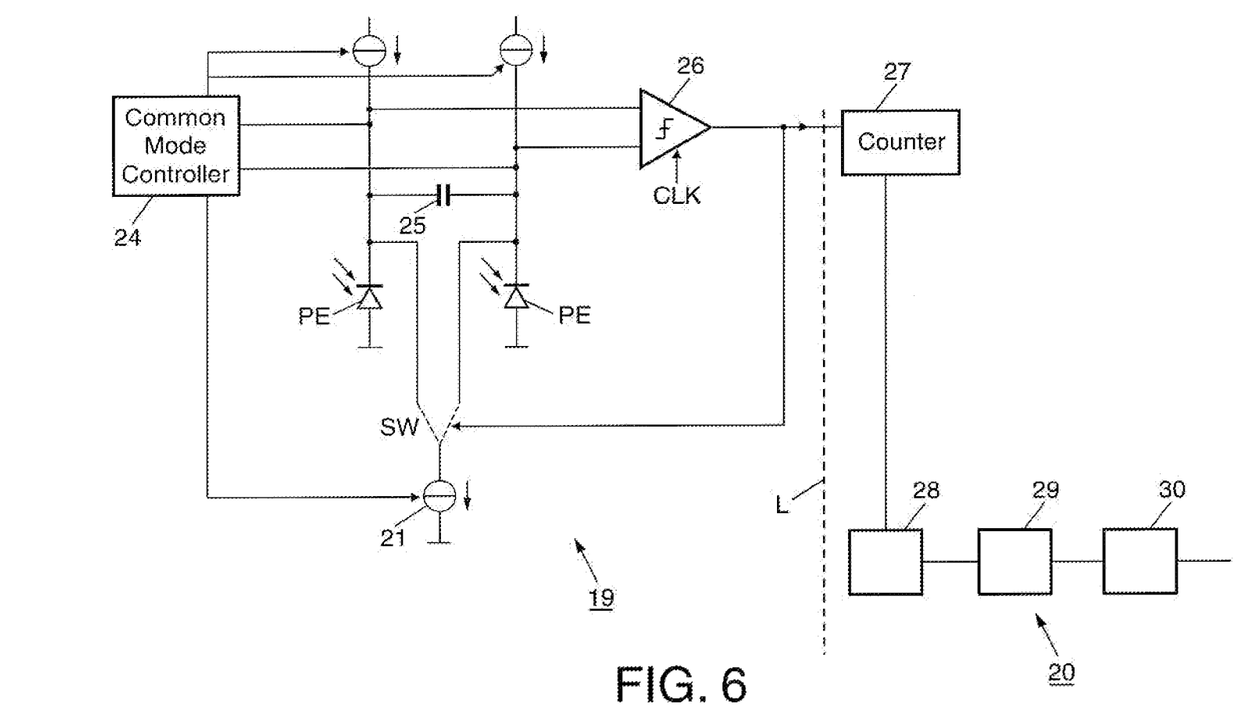
FIG. 6 shows a schematic circuit arrangement of the analogue-to-digital converter ADC and the further data path for measuring current differences.

The three current sources, may be connected to a common mode controller 24 (common mode control means, FIG. 6, described hereinafter) adapted for providing, to the circuit arrangement shown in FIG. 5, and specifically to the ADC function thereof, a common mode control. Specifically, the first and second current sources are supplied with a horizontal common mode control signal CMX and a vertical common mode control signal CMY, respectively. These horizontal and vertical common mode control signals CMX and CMY are generated by the common mode controller 24 (FIG. 6). The common mode signals CMX and CMY serve for obtaining a common mode control when evaluating the output signals of the detectors D1 to D4 in the detection in the X direction (detectors D3 and D4) and in the Y direction (detectors D1 and D2).

The current sources are connected via switches SW to an integration capacitance 25 (node and signal Vdet in FIG. 5) and the input of a (clocked) comparator 26. That is, the clocked comparator 26 is supplied with the signal Vdet which constitutes a detection signal of the voltage or potential of the integration capacitance 25. The comparator 26 is also supplied with a voltage Vref which constitutes a reference voltage, and is further adapted for comparing the voltage on the node Vdet to the reference voltage Vref. In a preferred embodiment, the switches (bottom and top switches) SW for connecting the respective bottom and top current sources may be provided in the form of transistors.

Regarding the functioning of the circuit arrangement, the top and bottom switches SW are alternately closed and opened under control of the comparator 26 (output signal: todig). When it is considered that the top switch is closed and the bottom switch is opened, the voltage on the node Vdet then starts rising. As soon as the voltage on the node Vdet raises to a value higher than the voltage Vref (reference voltage supplied to the comparator for comparison purposes), the comparator 26 switches on the next clock and, thus, opens the top switch and closes the bottom switch.

This means that the voltage on the node Vdet starts falling. As soon as the decreased value of the voltage Vdet on this node become lower than the reference voltage Vref, the comparator 26 switches again and opens the bottom switch and closes the top switch.

The ration top current versus total bottom current defines the number of clock periods per detection output period.

For example, when the top current in the upper portion of the circuit arrangement shown in FIG. 5 is about 10× higher than the bottom current, the amount of clock periods it takes to open the bottom switch is about 10× higher than to open the top switch. Since the top current source is fixed the function of the circuit arrangement according to FIG. 5 of the present invention can measure the current flowing through the bottom current sources by simply counting the amount of clocks over one or a number of periods of the output of the comparator 26 (to this end, the comparator 26 may be connected to a counter 27, see FIG. 6). By means of this concept of detecting the current in the circuitry it is also possible to detect an increase or decrease of the current due to an increased or decreased irradiance (FIG. 4) on the detectors D1 to D4 (FIG. 2) which correspond to the click detection.

FIG. 6 shows a schematic circuit arrangement of the analogue-to-digital converter ADC and the further data path for measuring current differences presenting further details of the circuitry.

The circuitry of FIG. 6 shows an analogue portion 19 (representing the analogue-to-digital converter ADC) as well a digital portion 20. The borderline between both portions is represented by a dashed line L. The common mode controller 24 for generating the common mode signals CMX and CMY supplies these common mode signals to the plural current sources for controlling the current sources. In the circuit arrangement of FIG. 6, for example, two top current sources and one bottom current sources are shown. For generating the common mode signals CMX and CMY the common mode controller senses the potential of the integration capacitance 25, and this potential is also fed to the clocked comparator 26 for providing the comparison process and outputting a corresponding digital signal (todig in FIG. 5).

The circuit arrangement of the analogue-to-digital converter ADC shows in the analog portion 19 in a general form, for example, two photosensitive elements PE which represent particular ones of the detectors D1 to D4, depending upon the detection in the X or Y direction. It is also possible to provide in addition to the detectors D1 to D4 further separate photosensitive elements PE for the click detection. The integration capacitor 25 is connected at its terminals to the photosensitive elements PE, while the other terminal of the photosensitive elements PE is connected to ground.

By comparing, by means of the comparator 26, the outcome with previously obtained results it is possible to detect a click or a release of the joystick which is represented by a change of the light intensity (irradiance, FIG. 4) on the respective detectors D1 to D4 or the photosensitive elements PE within the light spot 9. In particular, as is shown in FIG. 4, when a considerably higher irradiance is falling on the detectors D1 to D4 or in general on the photosensitive elements PE, and the current increases accordingly, this can be detected by the circuit arrangements of FIGS. 5 and 6. More specifically, if the amount of clocks (as output by the comparator 26 and counted by the counter 27 of the digital portion 20) is lower than previous, a click is detected. This corresponds to higher current of the bottom current sources. If the amount of counted clocks is lower than previous, a release of the knob 6 is detected (corresponding to a lower current through bottom current sources).

Specifically, the signals CMX and CMY are respectively the common mode signals of the horizontal and the vertical ADC. The output of the common mode controller 24, that is, the signals CMX and CMY determine the amount of current flowing through the top and bottom current sources. This current is controlled preferably to about twice the medium current through the photosensitive elements (such as photodiodes) PE to obtain the dependency on the varying current caused by the varying irradiance on the photosensitive elements PE. That is, when the knob 6 is depressed by the user to obtain the click function it is expected that the current through the diodes rises, for example, more than a factor 2 (see FIG. 4).

This means that the output of the common mode controller 24 also changes so that the current through the top and bottom current sources also rises in the same ration. Hence, based on this detection principle a click or release edge of the current can be measured easily and precisely, so that a click and a release operation performed by the user (depressing or releasing the knob 6) can be determined in a reliable manner.

Hence, the analogue portion 19 of the circuit arrangement of FIG. 5 corresponding to the ADC provides the analogue-to-digital conversion function, and the output signal thereof may be communicated to the counter 27. This output signal represents a data density modulation (resulting in: zero=0000..., idle=1010..., Fs=1111...). The counter 27 belongs to the digital portion 20 of the circuit arrangement. The counter may be provided in the form of a 10 bits counter.

The counting result may be further communicated to an offset unit 27 which can be connected to a gain unit 28. The gain unit 28 is further connected to a threshold unit 29, and a threshold can be considered to avoid false detection due to noise influences. Moreover, by counting over more periods the accuracy can be increased.

The output of the common mode controller 24 is a representation of the medium current through the corresponding photosensitive elements PE. During the click, that is, during the operation (depression) of the knob 6 by the user and due to an increase in the irradiance on the photosensitive elements PE the current through the photosensitive elements PE raises significantly. By detecting differences in the common mode signal over time, according to a preferred embodiment in conjunction with a threshold, the click function or release of the knob 6 can be detected. Accordingly, the digital signal, that is, the digital output signal of the comparator 26, which is indicative of the movement in the Z direction (predetermined direction), is based on the output signals of the detectors (of at least one detector) and on the common mode signals (at least one common mode signal). This is schematically depicted in FIG. 5.

The circuit arrangement in total functions as a 1-bit first order sigma delta converter.

Figure 7:
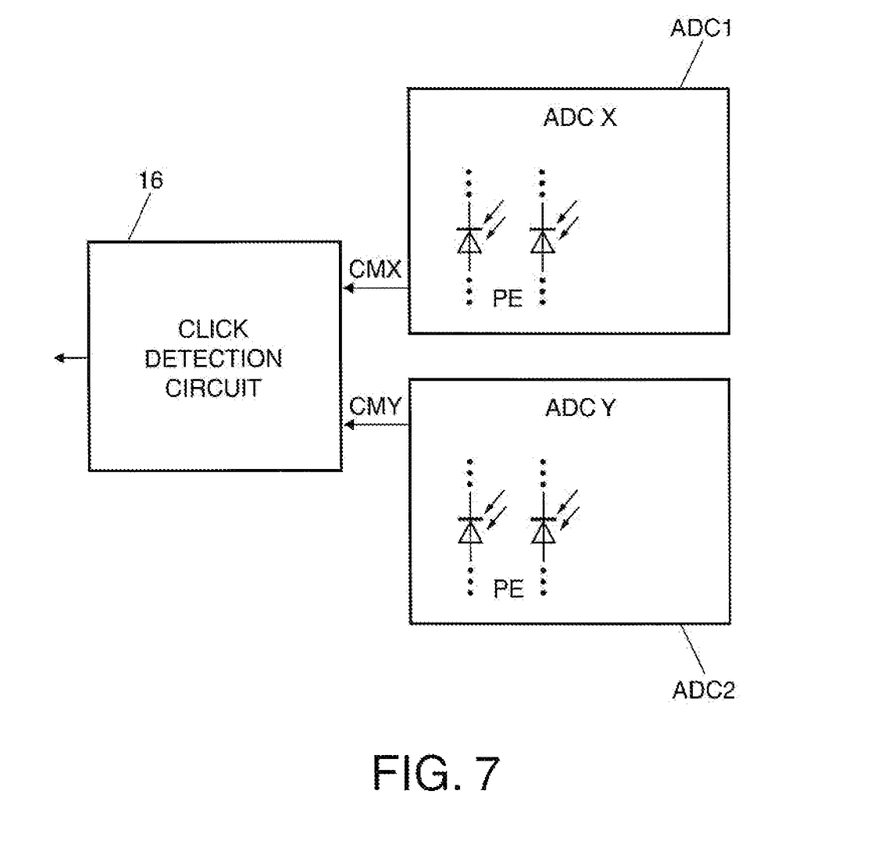
FIG. 7 shows a block diagram of the total setup with two analogue-to-digital converters ADC for the click detection and the connection to the click detection circuitry.

FIG. 7 shows a block diagram of the total setup with two analogue-to-digital converters ADC for the click detection and the connection to the click detection circuitry 16 (FIG. 3).

Specifically, as can be seen from the context of FIG. 7, each of first and second analogue-to-digital converters ADC1 and ADC2 can be configured as the circuit arrangement shown in FIG. 6. That is, according to the above setup, the first analogue-to-digital converter ADC1 is used for the evaluation of the output signals of the detectors D1 to D4 or of the photosensitive elements PE in the X direction, and the second analogue-to-digital converter ADC2 is used for detection in the Y direction. In other words and with reference to FIG. 2, one analogue-to-digital conventer is used for top and bottom detector (D1 and D2, Y direction), and the other analogue-to-digital conventer is used for the left and right detector D3 and D4, X detection). The corresponding common mode signals CMX and CMY, respectively, are generated by the respective common mode controllers of the ADC1 and ADC2 for horizontal detection (X) and vertical detection (Y).

In addition, besides the analog portion of FIG. 5 included in each of the blocks ADC1 and ADC2, the digital portion can also be included for complete data evaluation. The respective common mode signals CMX and CMY of the common mode controllers generated for controlling the internal current sources (controlled current sources) of the analogue-to-digital conventers ADC1 and ADC2 are also fed to the click detection circuit 16 (FIG. 3). The click detection uses the common mode signals CMX and CMY from both ADC1 and ADC2.

Figure 8A:
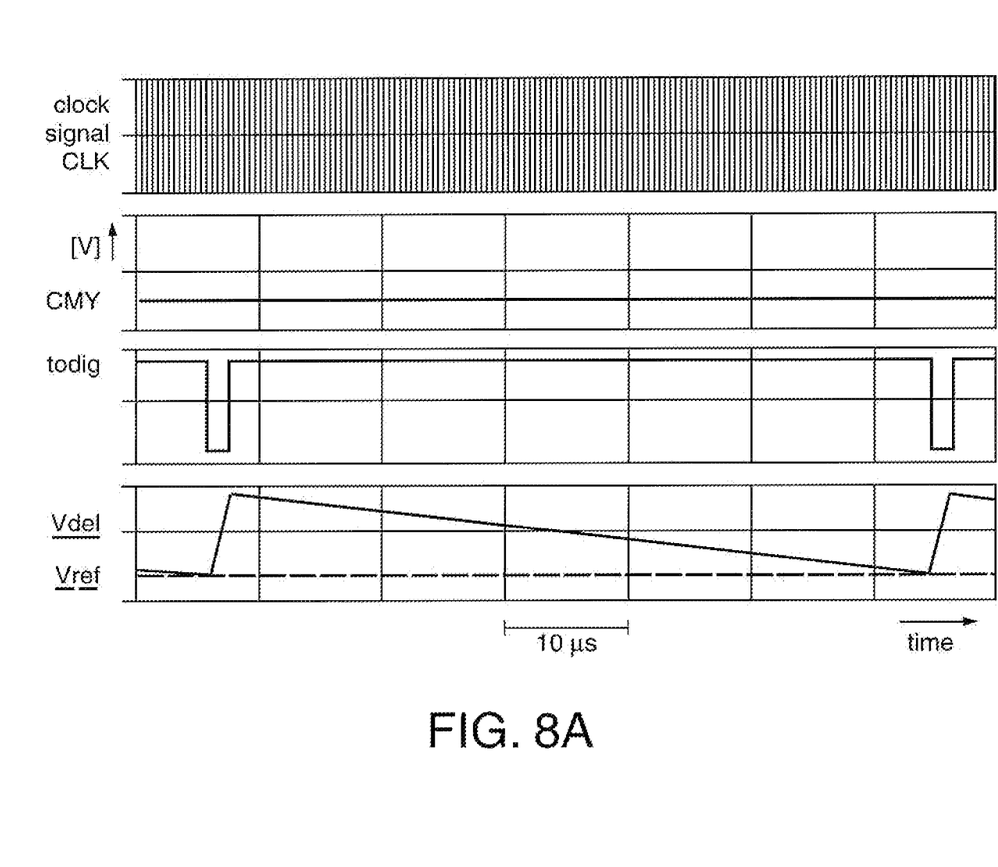
FIGS. 8a and 8b show signal wave forms of particular nodes and components of the circuit arrangement of FIG. 6.
Figure 8B:
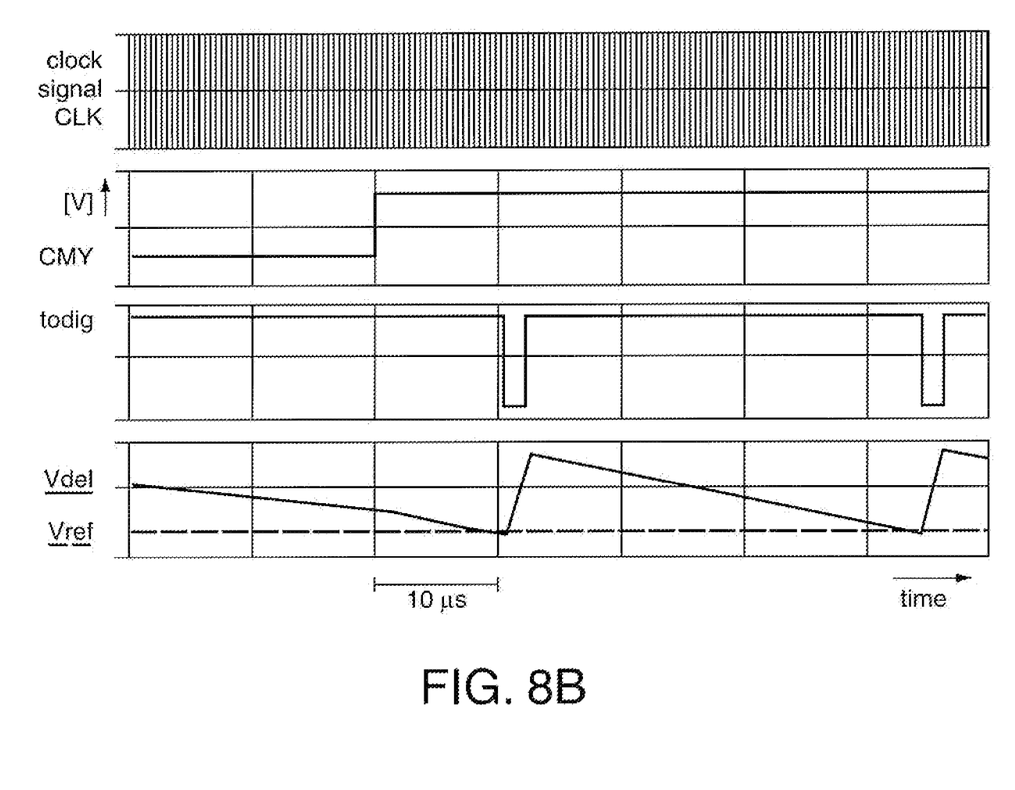

FIGS. 8*a* and 8*b* show a time chart of signals (signal wave forms) occurring in the circuit arrangement shown in FIG. 5. In this example the clock frequency is about 1 MHz, the top current in the circuit arrangement is about 10 μA, and the bottom current is two times 0.1 μA.

Specifically, FIG. 8*a* shows the situation where the knob 6 is not operated by the user and remains in the rest position. This results in a lower current in the circuitry and, thus, to a longer counting period (higher number) of pulses based on the clock CLK (longer charging period of the capacitance 25).

However, when, according to FIG. 8b, the knob 6 is operated and a higher current is detected in the photosensitive elements PE (or detectors D1 to D4) and in conjunction with the common mode signals CMX and CMY, then a click function is detected. The higher current leads to a shorter counting period and to a smaller number of counted pulses. (shorter charging period of the capacitance 25). According to the present invention, the click and release detection is completely coupled to the ADCs, and in the circuitry the same clock is used. The ADCs can be integrated on the same substrate 2 already accommodating the detectors D1 to D4, any photosensitive elements PE and the light source S. FIG. 2 shows for example the specific areas A1 and A2 for the ADCs.

Switching on and off to save power of the circuit arrangement can be done in a similar way. It is further not necessary that the exact current through the photosensitive elements PE (such as photodiodes) is known. The detection method is self-calibrating. More specifically, slow variations, e.g. due to ambient temperature changes are not detected.

It is possible to optionally chose horizontal and vertical common mode currents, or only one of these. The circuit arrangement also has low power consumption. The power consumption can further be reduced by lowering the current through the bottom (and top) current sources. Switching the current sources off in between measurements can save even more power.

It was described above that the detectors D1 to D4 and also, in case of additional photosensitive elements for click detection (Z detection) these photosensitive elements are completely located within the light spot 9 caused by the reflecting unit 8 when reflecting light from the light source S. In this case, this means that the light acts like a constant background signal on all photosensitive elements PE, and for X and Y detection and specifically for Z detection this can be ruled out.

Furthermore, as can be derived from FIG. 4, the click detection can be performed with detecting a higher intensity of illumination light (irradiance). According to a further modification, the click detection can be done by putting at least one photosensitive element PE close to the light source S. By repeatedly and continuously measuring the integration time and comparing it with previous measurements, as mentioned above, a click function (click operation by the user) can easily and with a simplified circuitry be detected.

The signal flow as shown in the analogue portion 19 of the circuit arrangement of FIG. 6 represents the analogue implementation. The complete circuit arrangement of FIG. 6 represents a differential current integrator combined with a 1-bit time continuous bit stream ADC, and a 10 bits output can be achieved.

For calibration the common mode controller is provided for regulating the current integrator to the correct current of the at least one photosensitive element PE which is dependent on the amount of light incident on this photosensitive element PE. From this analogue common mode signal (for example CMX and CMY) the click function can be derived. An offset correction, a gain and a threshold function can be done, as can be seen from FIG. 6, in the digital portion 20 thereof.

The current to the light source S can be controlled by the central controller 13 and can be fixed. It can further be programmed according to predetermined conditions, probably based on experimentally found basic values.

It is further to be noted that, with reference to FIGS. 1 and 2, the digital circuit areas 11 and 12 provided for accommodating the further circuitry, such as shown in FIG. 6, may be covered with a metal shield to avoid problems due to light irradiated on the substrate. This is since the first and second digital circuit areas 11 and 12 (FIG. 2) fully or partly lie within the light spot 9 created by the reflecting function of the reflecting unit 8. Alternatively or in addition thereto, the reflecting unit 8 can be given a suitable shape to avoid or at least reduce incident light on the digital circuit areas 11 and 12 provided for the integration of further circuitry.

Figure 9:
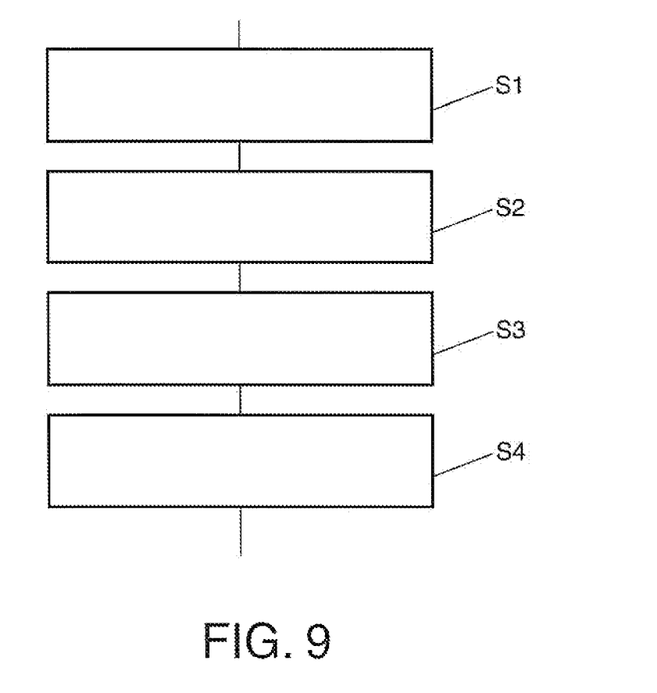
FIG. 9 shows a flow chart depicting the steps of the method of detecting movement of a movable object.

According to FIG. 9 which shows a flow chart of the method of detecting movement of a movable object, the method comprises a first step S1 of radiating light (by means of the light source S) to the reflecting unit and reflecting the light (by the reflecting unit 8) to at least one detector (D1 to D4, PE). Thereafter, a second step S2 is provided of detecting said reflected light and outputting detection signals (by said at least one detector) for determining the movement of said movable object 6. A third step S3 concerns generating at least one common mode signal depending upon said detection signals, and the fourth step S4 refers to generating a digital signal indicative of said movement of said movable object in a predetermined direction Z based on said detection signal of said at least one detector and said at least one common mode signal. In particular, the method of detecting movements of a movable object exhibits the same advantages as the detection system as described above.

The detection system according to the present invention for detecting a movable object was described in conjunction with the operation of a joystick, and in particular on the basis of the movement of the knob 6 by the user, and the detection of this movement by the detection system. Besides the use of the detection system for detecting the movement of a joystick the present invention can be applied to all corresponding devices or means wherein a similar detection of any movement of a movable object along the three spatial coordinates takes place. A reliable detection in a base plane (X and Y plane) as well as in a Z direction can be performed with high reliability and with a circuitry which can be arranged in an integrated form commonly on a substrate for easy manufacturing and handling thereof. That is, the present invention also concerns an integrated circuit (IC) having implemented therein the detection system for detecting movement of the movable object and including the hardware as described above.

While the present invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

Any reference signs in the claims should not be construed as limiting the scope.

The invention claimed is:
1. Detection system for detecting movements of a movable object, said system comprising:
a light source for emitting light,
a reflecting unit being arranged in functional connection with said movable object and being adapted for reflecting said emitted light, at least one detector for detecting said reflected light and outputting detection signals for determining a movement of said movable object, an analogue-to-digital converter which includes at least one current source, for obtaining a digital signal, and a common mode controller for outputting at least one common mode signal for controlling said at least one current source, wherein said digital signal is indicative of said movement of said movable object in a predetermined direction and is based on said output signal of said at least one detector and said at least one common mode signal.

2. Detection system according to claim 1, further comprising a plurality of detectors arranged symmetrically relative to said light source, and said reflecting unit being arranged with a predetermined distance above said light source for directing reflected light to said plurality of detectors.

3. Detection system according to claim 1, wherein said at least one detector, said light source, said common mode controller and said analogue-to-digital converter are arranged on a substrate, and said reflecting unit is adapted for causing a light spot to be incident on said substrate.

4. Detection system according to claim 1, wherein said movable object is a knob elastically supported for at least said predetermined movement causing a variation of irradiance of said reflected light on said at least one detector.

5. Detection system according to claim 1, wherein said at least one detector is a photosensitive element, said light source is a light emitting element, and said reflecting unit is a metalized reflection surface.

6. Detection system according to claim 1, wherein said analogue-to-digital converter comprises a capacitance connected to said at least one detector and said at least one current source, and a comparator to which a potential of said capacitor is supplied for generating said digital signal.

7. Detection system according to claim 1, wherein said at least one common mode signal is adapted for determining an amount of current flowing through said at least one current source, said at least one current source being connected via at least one switch to a capacitance a potential of which is supplied to a comparator of said analogue-to-digital converter for generating said digital signal.

8. Integrated circuit having implemented therein a detection system for detecting the movements of a movable object according to claim 1.

9. Detection system according to claim 3, wherein said light spot caused by said reflecting unit includes a predetermined irradiance profile of reflected light, and the determination of said movement of said movable object in said predetermined direction is based on an increase in the irradiance profile of said light spot on said at least one detector due to said movement.

10. Detection system according to claim 3, wherein said light spot of said reflected light on said at least one detector has a predetermined size which remains unchanged when said movable object is moved.

11. Detection system according to claim 7, further comprising a plurality of switches, and said comparator being adapted to compare said potential of said capacitance with a predetermined reference value, and controlling an opened or closed state of said switches depending upon a comparison result.

12. Detection system according to claim 11, further comprising a counter being adapted for counting clock pulses based on a clock signal, and said counted number of clock pulses being dependent on the opened or closed state of said plural switches controlled by said comparator.

13. Detection system according to claim 12, wherein said comparator controls said open or closed state of said plural switches according to a predetermined timing, and said predetermined timing is based on the current flowing through said at least one detector.

14. Detection system according to claim 12, further comprising an evaluation unit being adapted for comparing the pulses counted by said counter with previous counted results for determining said movement of said movable object in said predetermined direction.

\* \* \* \* \*